United States Patent
Nakanishi et al.

(10) Patent No.: US 6,614,743 B1
(45) Date of Patent: Sep. 2, 2003

(54) SEMICONDUCTOR LASER DEVICE

(75) Inventors: Naoki Nakanishi, Shiga (JP); Syouichi Takasuka, Osaka (JP); Shinichi Ijima, Osaka (JP); Hideyuki Nakanishi, Shiga (JP); Akio Yoshikawa, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 180 days.

(21) Appl. No.: 09/710,995

(22) Filed: Nov. 9, 2000

(30) Foreign Application Priority Data

Nov. 11, 1999 (JP) .......................................... 11-320541

(51) Int. Cl.7 .......................... G11B 7/00; G11B 7/135
(52) U.S. Cl. ...................... 369/121; 369/112; 369/116; 369/112.01; 369/112.03; 369/112.05; 369/112.06
(58) Field of Search ................................. 369/121, 112, 369/116, 112.01, 112.03, 112.05, 112.06

(56) References Cited

U.S. PATENT DOCUMENTS

| | | | | |
|---|---|---|---|---|
| 5,293,038 A | * | 3/1994 | Kadowaki et al. | 250/216 |
| 5,446,719 A | | 8/1995 | Yoshida et al. | |
| 5,515,354 A | * | 5/1996 | Miyake et al. | 369/112 |
| 5,615,203 A | * | 3/1997 | Fukakusa | 369/244 |
| 5,874,730 A | * | 2/1999 | Yi et al. | 250/214 |
| 5,939,773 A | * | 8/1999 | Jiang et al. | 257/666 |
| 6,192,020 B1 | * | 2/2001 | Takasuka et al. | 369/103 |
| 6,392,977 B2 | * | 5/2002 | Ando et al. | 369/112.01 |

FOREIGN PATENT DOCUMENTS

| | | | |
|---|---|---|---|
| JP | 4-139628 | * | 5/1992 |
| JP | 5-217199 A | | 8/1993 |

* cited by examiner

Primary Examiner—Allan R. Wilson
Assistant Examiner—Joseph Nguyen
(74) Attorney, Agent, or Firm—Merchant & Gould P.C.

(57) ABSTRACT

A semiconductor laser device includes a semiconductor laser element, a light beam branching element for branching a light beam emitted from the semiconductor laser element and reflected by an optical recording medium into a plurality of light beams, a light beam reflector for reflecting the light beam branched by the light beam branching element, and a photodetector portion for detecting the light beam reflected by the light beam reflector. The light beam branching element and the photodetector portion are formed on the same substrate. The miniature semiconductor laser device can be assembled without complicated position adjustment and has less deterioration of characteristics arising from misregistration during and after assembly.

16 Claims, 20 Drawing Sheets

Incident Light Beam

SEMICONDUCTOR LASER DEVICE

BACKGROUND OF THE INVENTION

1. Field of the Invention

The present invention relates to a semiconductor laser device having a function of detecting reproduction signals and various servosignals. The device is incorporated into an optical head, which is a main component of an optical information processing device that records, reproduces, and erases information on an optical recording medium.

2. Description of the Related Art

Generally, for accurately reading signals recorded on an optical recording medium such as an optical disk, focus/tracking errors caused by surface oscillation or off center rotation of a rotating disk need to be detected as signals and adjusted by a focus/tracking servo actuator.

For detection of the focus/tracking error signals and reproduction signals, a semiconductor laser device illustrated in FIG. 20 has been used conventionally. The structure and the operational principle of this device will be explained in the following. Broken lines in FIG. 20 show either an outgoing light beam from a semiconductor laser element 101 or a reflected light beam from an optical recording medium 105. The elements in cross section are only partially provided with hatching for clarity.

A light beam emitted from a light source, i.e. the semiconductor laser element 101, is diffracted by a 3-beam formation diffraction grating element 102 in the direction Y indicated in the drawing, and the zero-order diffracted light is branched into a main beam and the first ± order diffracted light is branched into sub-beams. The light paths of these three branched light rays are deflected at an angle of 90° by a beam splitter 103 and focused by focusing means, e g. an objective lens 104, onto the optical recording medium 105. The light beam reflected by the optical recording medium 105 enters a light beam branching element, i.e. a hologram optical element 106. The hologram optical element 106 is provided with diffraction gratings that have a lens effect. The light beam reflected by the optical recording medium 105 is led by the hologram optical element 106 to photodetector element groups 109 and 110. Among the reflected light beams led to the photodetector element groups 109 and 110, reproduction signals and focus error signals are detected from the main beam, and tracking error signals are detected from the sub-beams. Moreover, the objective lens 104 is provided in an actuator and driven on the basis of the detected focus/tracking error signals in the optical-axial direction and in the direction perpendicular to the track.

However, the conventional semiconductor laser device illustrated in FIG. 20 has many optical components that also need to be arranged individually, so that the device cannot be miniaturized easily. Furthermore, since each optical component is positioned discretely, it is necessary to take a lot of trouble for adjusting and fixing each position. In particular, since the relative position between the hologram optical element 106 and the photodetector element groups 109, 110 has a great influence on the characteristics of reproduction signals and focus/tracking error signals, position adjustment with high-precision has been required. Therefore, a great deal of time and cost are necessary for assembling. In addition, slight misregistration during and after assembly causes deterioration of the characteristics.

SUMMARY OF THE INVENTION

It is an object of the present invention to solve the conventional problems described above by providing a miniature semiconductor laser device that can be assembled without complicated position adjustment.

A semiconductor laser device of the present invention includes a semiconductor laser element, a light beam branching element for branching a light beam emitted from the semiconductor laser element and reflected by an optical recording medium into a plurality of light beams, a light beam reflector for reflecting the light beam branched by the light beam branching element, and a detector portion for detecting the light beam reflected by the light beam reflector. The light beam branching element and the detector portion are formed on the same substrate.

According to the configuration described above, the light beam branching element and a plurality of detector portions are integrated on the same substrate, so that the miniaturization of the device is achieved. Furthermore, since the relative position between the light beam branching element and the plurality of detector portions is determined at the time when the substrate is formed, position adjustment with high-precision is no longer necessary during assembly, and moreover, the deterioration of characteristics arising from slight misregistration during and after assembly can be avoided.

These and other advantages of the present invention will become apparent to those skilled in the art upon reading and understanding the following detailed description with reference to the accompanying figures.

BRIEF DESCRIPTION OF THE DRAWINGS

FIG. 15(A) is a plan view, and FIG. 15(B) is a perspective view.

FIG. 16(A) is a plan view, and FIG. 16(B) is a perspective view.

DESCRIPTION OF THE PREFERRED EMBODIMENTS

Hereinafter, the preferred embodiments of the present invention will be described with reference to the accompanying drawings.

Embodiment 1

Figure 1:
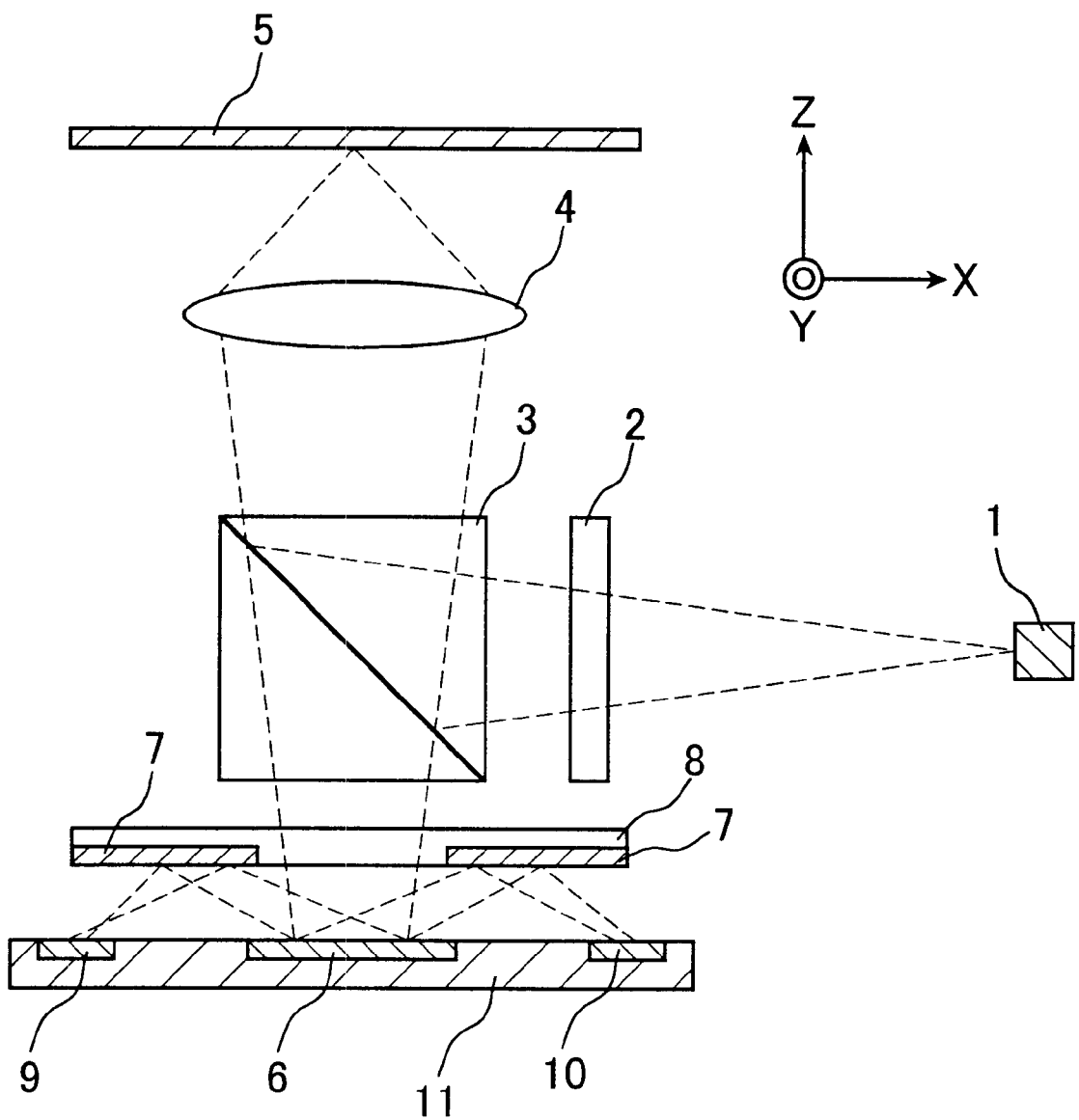
FIG. 1 is a sectional view showing a semiconductor laser device according to Embodiment 1 of the present invention.
Figure 2:
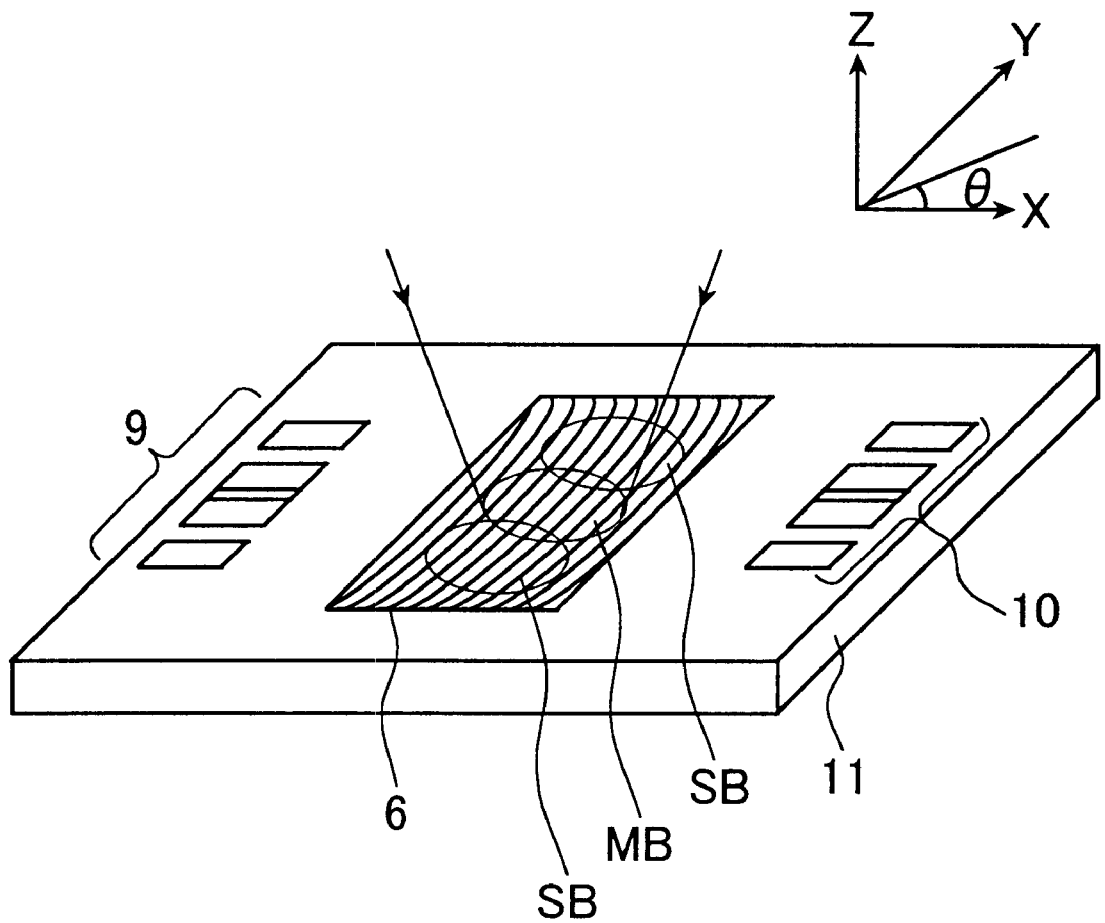
FIG. 2 is a perspective view showing the arrangement of a hologram optical element and photodetector element groups disposed on the substrate of the semiconductor laser device illustrated in FIG. 1.
Figure 3:
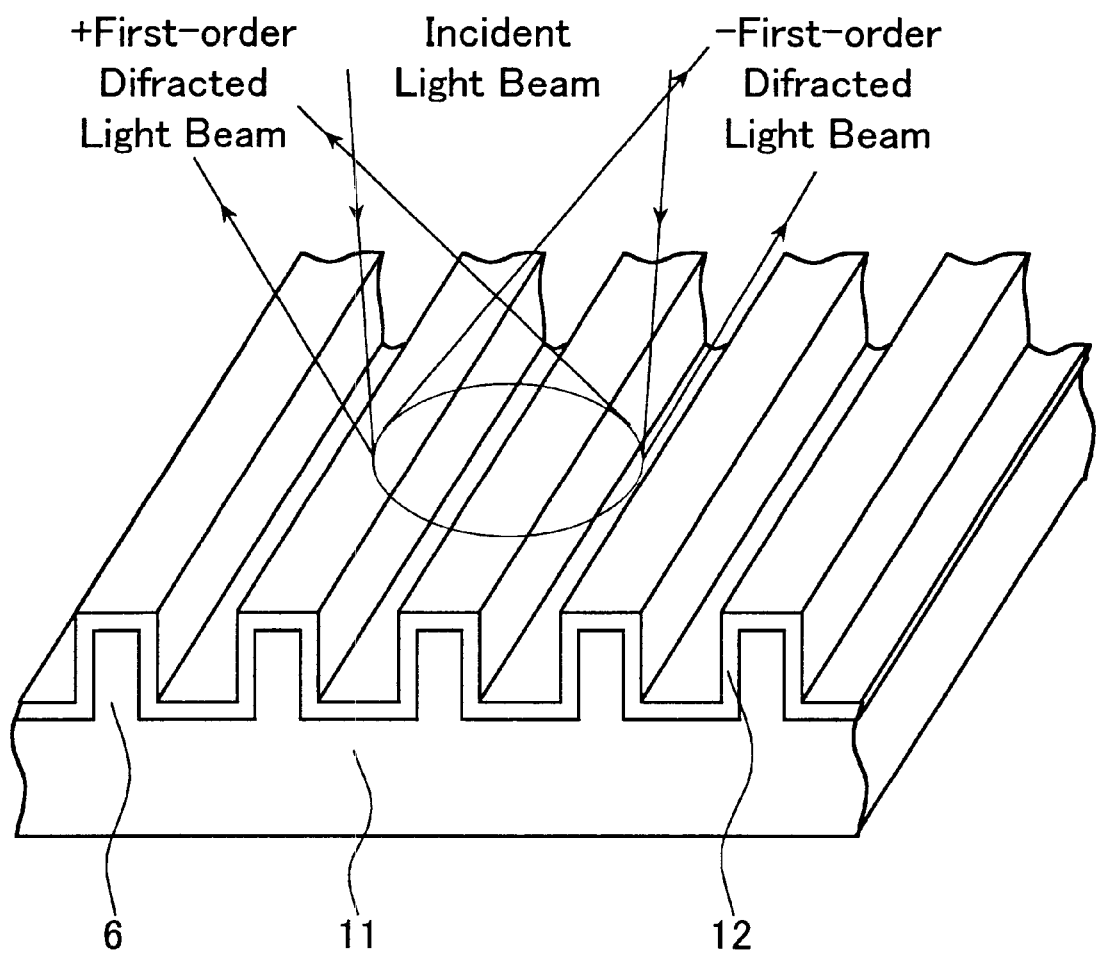
FIG. 3 is a perspective view showing the hologram optical element in the semiconductor device of FIG. 1.

With reference to FIG. 1 to FIG. 3, a semiconductor laser device in Embodiment 1 of the present invention will be explained. Broken lines in the cross-sectional views and circles in the perspective views show either an outgoing light beam from a semiconductor laser element 1 or a reflected light beam from an optical recording medium 5. The elements in cross section are only partially provided with hatching for clarity.

FIG. 1 is a sectional view showing the configuration of a semiconductor laser device in Embodiment 1. A light beam emitted from a light source, i.e. the semiconductor laser element 1, is diffracted by a 3-beam formation diffraction grating element 2 in the direction Y indicated in the drawing, and the zero-order diffracted light is branched into a main beam and the ± first-order diffracted light is branched into sub-beams. Here, the diffracted light with higher order than the ± first-order diffracted light is not taken into account because the diffraction efficiency is very small. The light paths of these three branched light rays are deflected at an angle of 90° by a light beam branching element, i.e. a beam splitter 3, and focused by focusing means, e.g. an objective lens 4, onto the optical recording medium 5. The light beam reflected by the optical recording medium 5 is directed via the objective lens 4 through the beam splitter 3 and a transparent substrate 8 to a light beam branching element, i.e. a hologram optical element 6, where the light beam is reflected and diffracted. The ± first-order reflected and diffracted light of the main beam and the sub-beams are reflected by a light beam reflector 7 provided on the transparent substrate 8 and enter photodetector element groups 9 and 10. As a result, reproduction signals and focus/tracking error signals are detected by the photodetector element groups 9 and 10. As illustrated in FIG. 2, the hologram optical element 6 and the photodetector element groups 9, 10 are formed on the same substrate 11, for example, on the same semiconductor substrate. In FIG. 2, MB represents the main beam, and SB represents the sub-beam.

According to this configuration, the hologram optical element 6 and the plurality of the photodetector element groups 9, 10 are integrated into one optical component, so that the miniaturization of the device is achieved. Moreover, the relative position between the hologram optical element 6 and the photodetector element groups 9, 10 can be adjusted with high-precision using one of the common semiconductor processing techniques such as the photolithographic technique. Furthermore, the grating direction of the hologram optical element 6 also can be adjusted with high-precision. In other words, it is possible to adjust the positions of the hologram optical element 6 and the photodetector element groups 9, 10 in the directions X, Y, and θ at the time when the substrate is formed. Therefore, position adjustment with high-precision is no longer necessary during assembly, so that the time and the cost for assembly can be reduced due to this simplified adjustment procedure. Since the relative position between the hologram optical element 6 and the photodetector element groups 9, 10 is fixed, the deterioration of characteristics arising from misregistration during and after assembly can be reduced. As a result, while the position precision was conventionally ±30 μm, the position precision can be improved to not more than ±1 μm according to the present invention.

The grating structure of the hologram optical element 6 may be formed directly on the substrate by wet etching or dry etching. Alternatively, a film made of other materials such as $SiO_2$ etc. may be formed on the substrate.

In addition, as illustrated in FIG. 3, by forming a reflective film 12 made of metals or dielectrics etc. on the entire surface of the hologram optical element 6, a light beam entering the hologram optical element 6 can be led to the photodetector element groups 9, 10 without being transmitted and absorbed. Accordingly, the levels of reproduction signals and focus/tracking error signals can be increased, so that the ratio of signal to noise (hereinafter referred to as S/N) can be improved.

Embodiment 2

Figure 4:
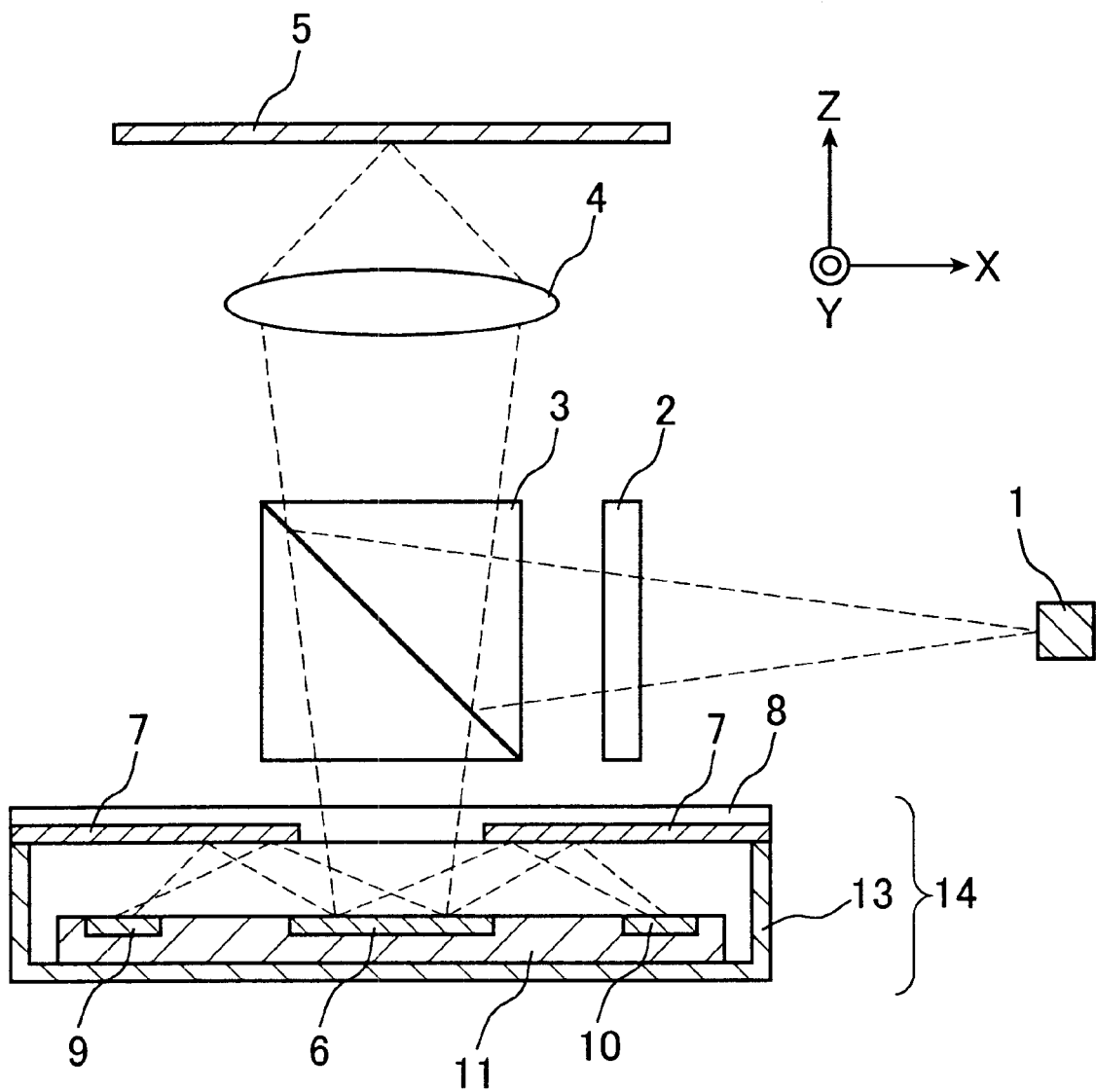
FIG. 4 is a sectional view showing a semiconductor laser device according to Embodiment 2.

According to the configuration in Embodiment 1, it is no longer necessary to adjust the positions of the hologram optical element 6 and the photodetector element groups 9, 10 in the directions X, Y, and θ during assembling, but it is still necessary to adjust the positions of the substrate 11, where the hologram optical element 6 and the photodetector element groups 9, 10 are integrated, and the light beam reflector 7 in the direction Z. In FIG. 4, a semiconductor laser device that does not require such adjustment is shown as Embodiment 2.

In Embodiment 2, the substrate 11, where the hologram optical element 6 and the photodetector element groups 9, 10 are integrated, is arranged inside one package 13. Then, the package 13 is sealed with the substrate 8 that is provided with the light beam reflector 7 to form a semiconductor laser unit 14. Due to this configuration, the positions of the substrate 11, where the hologram optical element 6 and the photodetector element groups 9, 10 are integrated, and the light beam reflector 7 can be adjusted in the direction Z by the shape of the package 13. By integrating the plurality of optical components in this way, the semiconductor laser device can be miniaturized. Moreover, due to the fact that the hologram optical element 6, the photodetector element groups 9, 10 and the light beam reflector 7 are sealed, dust protection can be effected so as to improve the reliability of these optical elements significantly.

The package 13 can be made by using various materials such as resin, ceramics, metals. However, for obtaining high-precision positioning, it is desirable to form a less flexible package by using materials with low flexibility.

Embodiment 3

Figure 5:
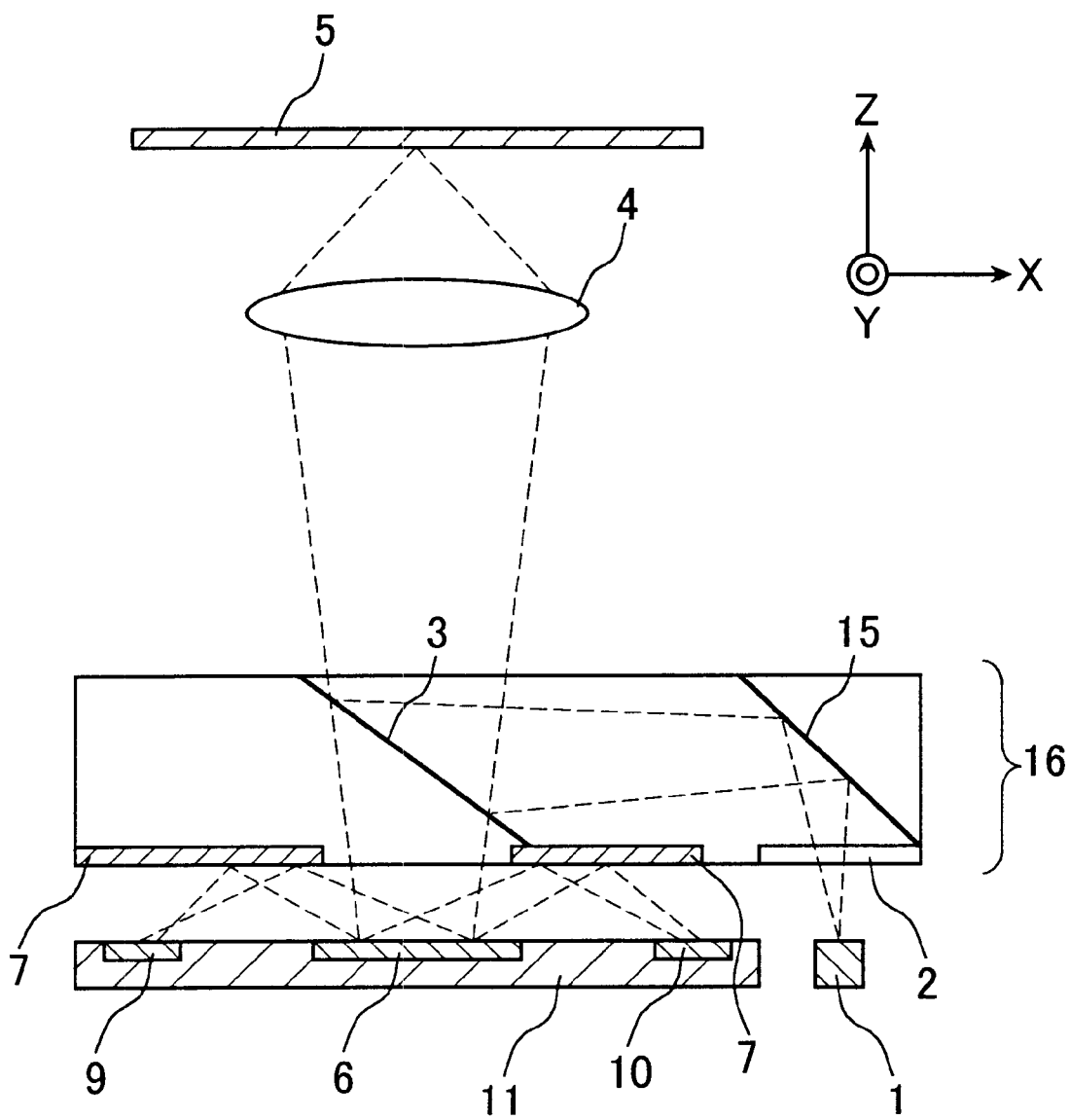
FIG. 5 is a sectional view showing a semiconductor laser device according to Embodiment 3.

FIG. 5 shows a semiconductor laser device according to Embodiment 3. In this embodiment, the semiconductor laser element 1 is arranged such that an outgoing light beam is directed upward, and the outgoing light beam from the semiconductor laser element 1 is then led in the lateral direction by a light beam reflector 15. Furthermore, the 3-beam formation diffraction grating element 2, the light beam reflector 15, the beam splitter 3, and the light beam reflector 7 are integrated into an integrated optical element 16. As a result, the number of optical components is reduced and the adjustment and the fixing of each position is no longer necessary, so that the time and the cost for assembly can be reduced. Additionally, the semiconductor laser device can be miniaturized further.

Embodiment 4

Figure 6:
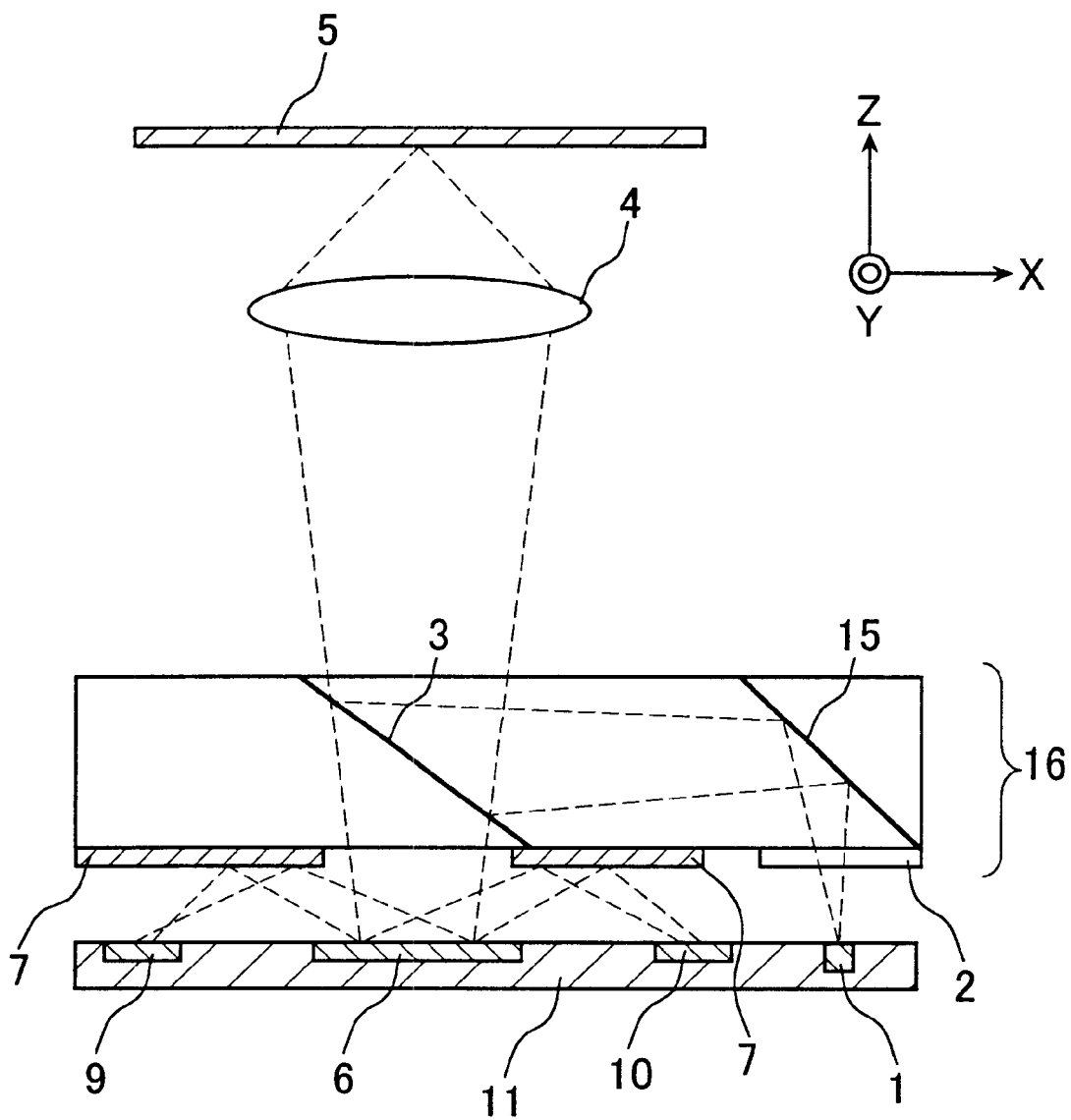
FIG. 6 is a sectional view showing a semiconductor laser device according to Embodiment 4.
Figure 7:
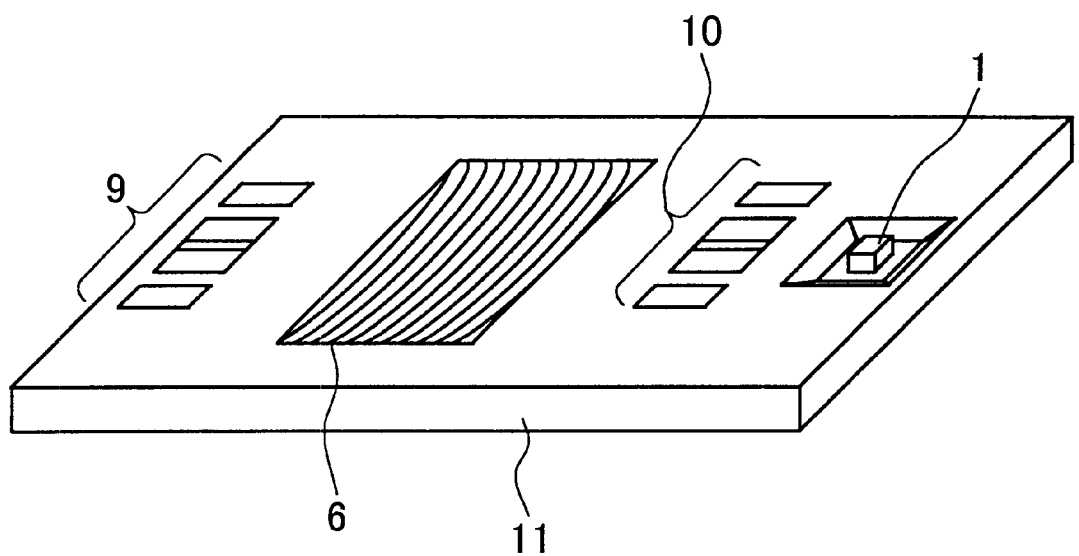
FIG. 7 is a perspective view showing the arrangement of a hologram optical element and photodetector element groups disposed on the substrate of the semiconductor laser device illustrated in FIG. 6.

FIG. 6 shows a semiconductor laser element according to Embodiment 4. In this embodiment, the semiconductor laser element 1 is integrated into the substrate 11, where the hologram optical element 6 and the photodetector element groups 9, 10 are integrated. FIG. 7 shows the configuration of the substrate 11 in detail. In this figure, the periphery of the semiconductor laser element 1 is shown differently from that portion in FIG. 6, because FIG. 6 shows a simplified view. According to this configuration, the relative position between the semiconductor laser element 1, the hologram optical element 6, and the photodetector element groups 9, 10 can be determined at the time when the integrated substrate 11 is formed. As a result, the trouble of adjusting and fixing the positions during assembly is reduced, so that the time and the cost for assembly can be reduced. Additionally, the semiconductor laser device can be miniaturized further.

Figure 8:
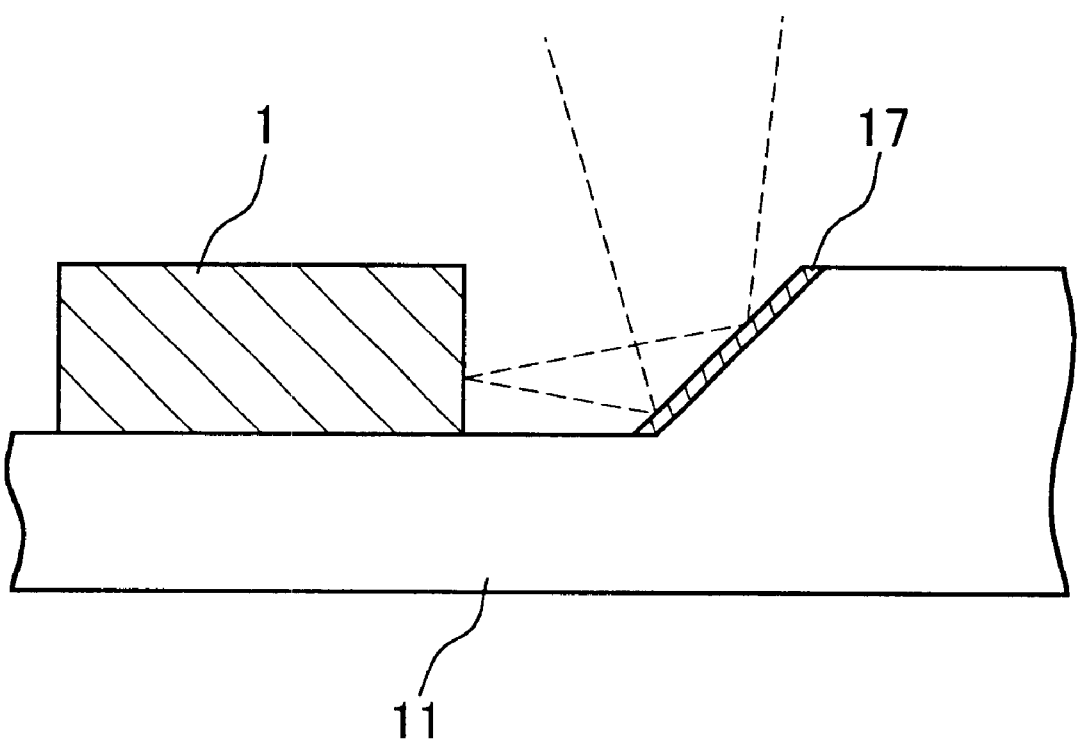
FIG. 8 is a sectional view showing one example of the semiconductor laser element arranged in the semiconductor laser device of the present invention.

This integration is realized by means of hybrid-forming in which the semiconductor laser element 1 is chip-bonded to the substrate 11, where the hologram optical element 6 and the photodetector element groups 9, 10 are integrated. The hologram optical element 6 and the photodetector element groups 9, 10 may be integrated monolithically. In the case where the semiconductor laser element 1 to be used is a surface-emitting semiconductor laser, it is sufficient to integrate the semiconductor laser element 1 with its emission surface facing upward. On the other hand, in the case of an end-face emitting semiconductor laser, as shown in FIG. 8, a concave portion having an inclined surface of about 45° will be formed in the substrate 11. By forming a reflective film 17 made of metals or dielectrics etc. on this inclined surface, a light beam emitted from the semiconductor laser element 1 can be directed out in the upper direction of the substrate.

Embodiment 5

Figure 9:
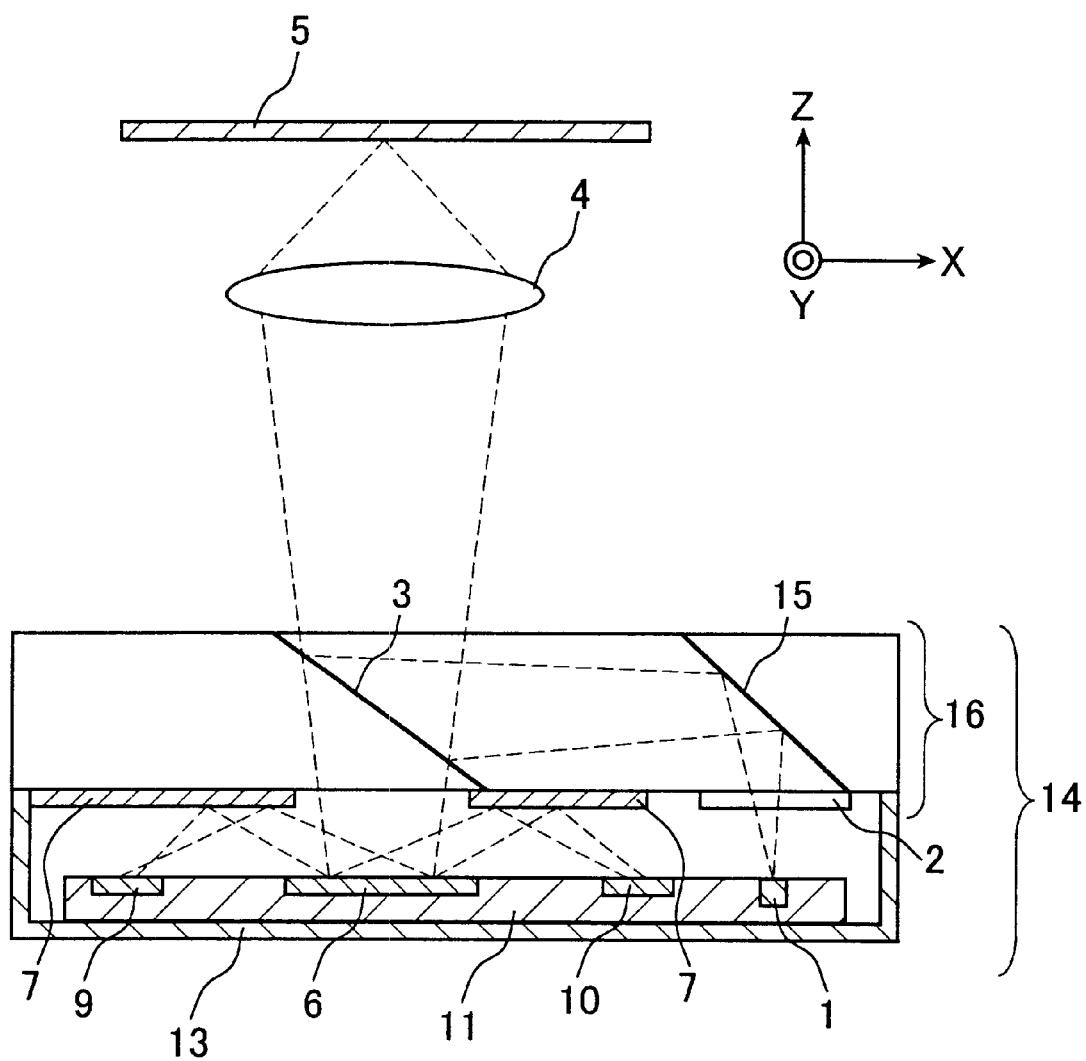
FIG. 9 is a sectional view showing a semiconductor laser device according to Embodiment 5.

FIG. 9 shows a semiconductor laser device according to Embodiment 5. In this embodiment, the substrate 11, where the semiconductor laser element 1, the hologram optical element 6, and the photodetector element groups 9, 10 are integrated, is arranged inside one package 13. Furthermore, the integrated optical element 16 can be formed by integrating the 3-beam formation diffraction grating element 2, the light beam reflector 15, the beam splitter 3, and the light beam reflector 7. The package 13 is sealed with the integrated optical element 16 to form a semiconductor laser unit 14. By integrating the plurality of optical components in this way, the semiconductor laser element can be miniaturized. Additionally, due to the fact that the hologram optical element 6, the photodetector element groups 9, 10, and the light beam reflector 7 are sealed, the reliability of these optical elements can be improved significantly.

Embodiment 6

With reference to FIG. 10 to FIG. 17, a semiconductor laser device according to Embodiment 6 of the present invention will be explained. Broken lines in the cross-sectional views and circles in the perspective views show either an outgoing light beam from the semiconductor laser element 1 or a reflected light beam from the optical recording medium 5. The elements in cross section are only partially provided with hatching for clarity.

Figure 10:
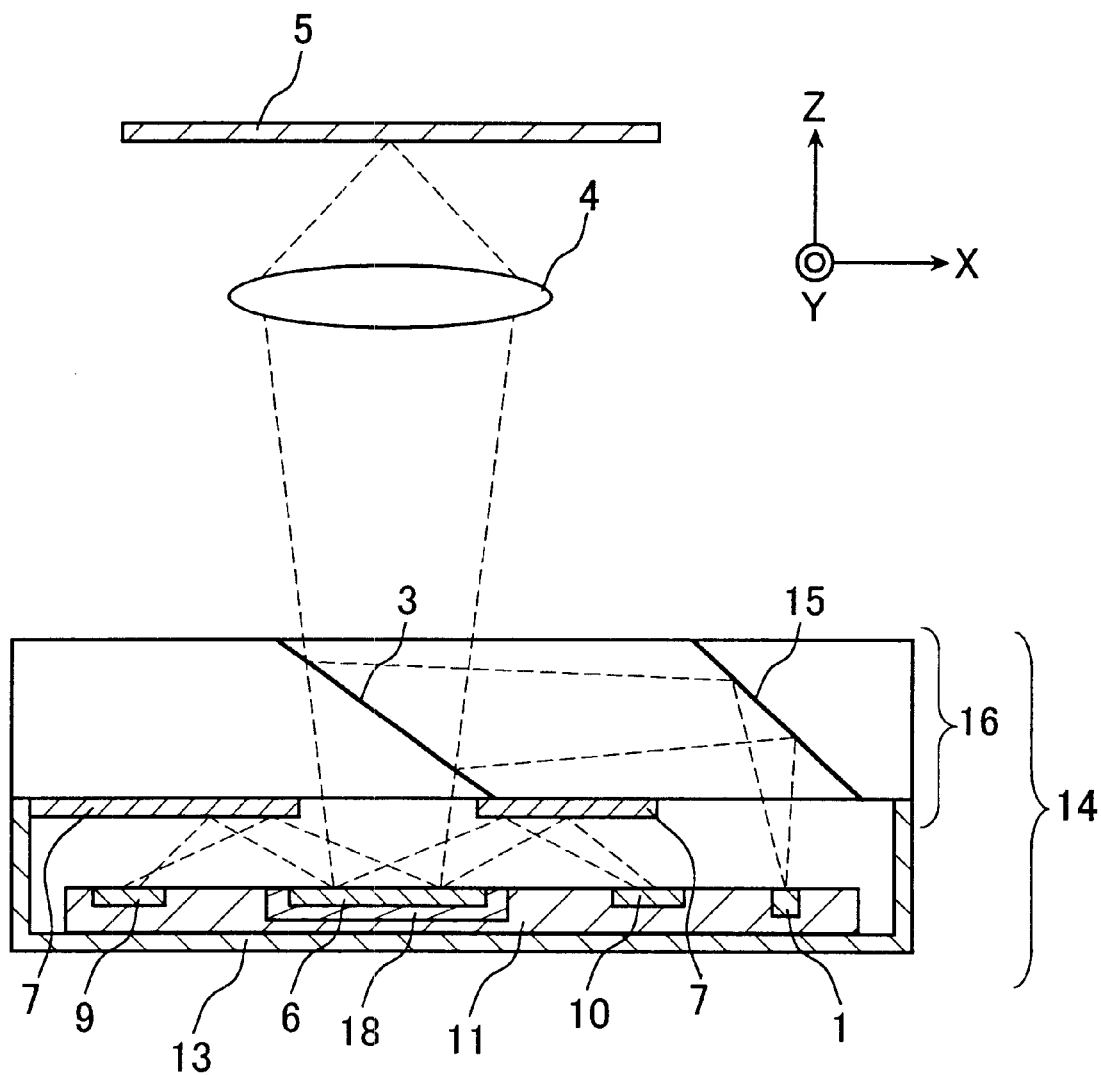
FIG. 10 is a sectional view showing a semiconductor laser device according to Embodiment 6.

FIG. 10 is a sectional view showing the configuration of the semiconductor laser device in Embodiment 6. The basic arrangement of each element as shown in the configuration of FIG. 10 is similar to that of the semiconductor laser device illustrated in FIG. 9. However, the device in Embodiment 6 obviously differs from that shown in FIG. 9 in that a photodetector element group 18 is provided under the hologram optical element 6 and that the 3-beam formation diffraction grating element 2 of FIG. 9 is not used. According to this configuration, tracking error signals are detected by the 1-beam system, so that the 3-beam formation diffraction grating element 2 is no longer necessary. As a result, since the number of optical components is reduced, further miniaturization and cost reduction of the device can be promoted. At the same time, the level of reproduction signals can be increased because the light beam for detection of tracking error signals is not branched, so that the S/N ratio can be improved.

Figure 11:
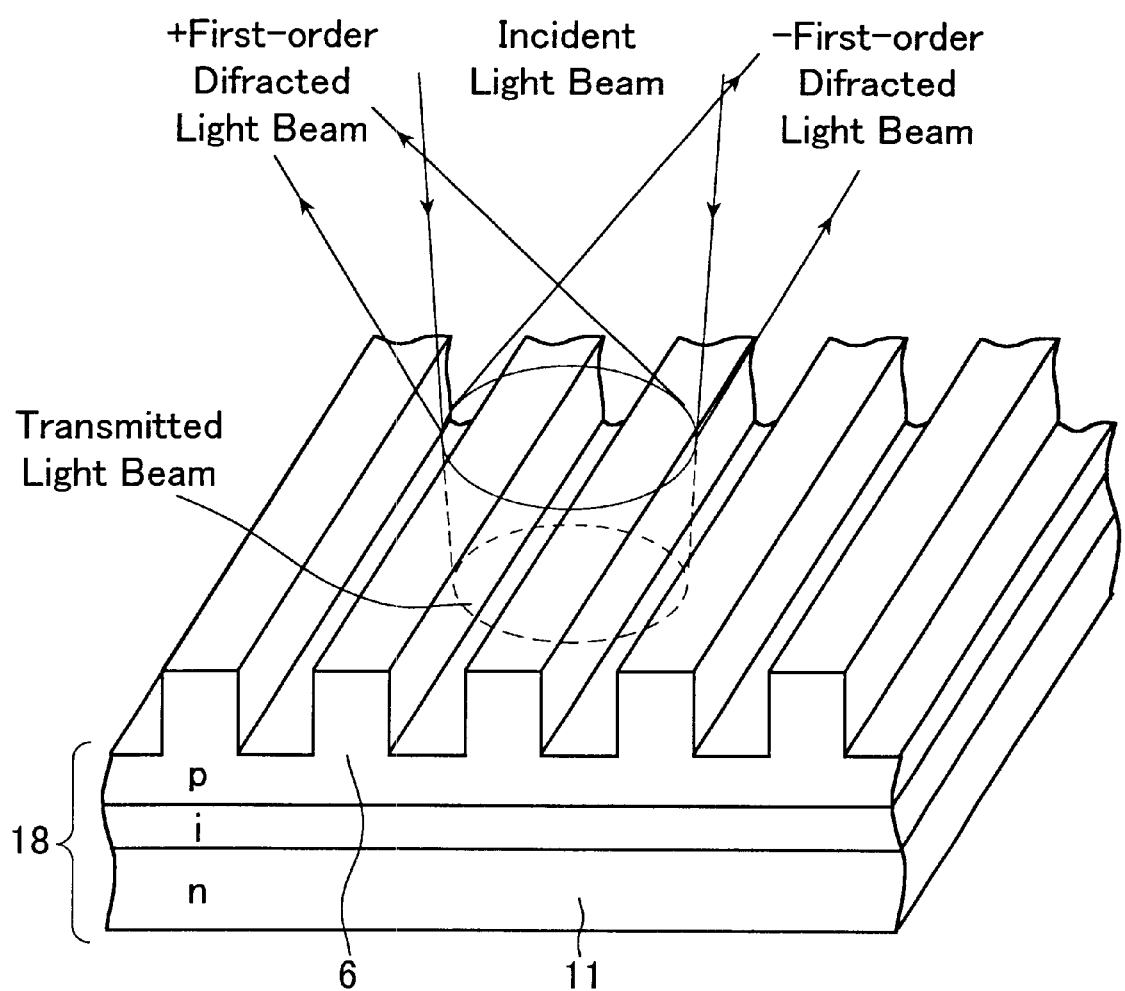
FIG. 11 is a perspective view showing one example of the configuration of the hologram optical element and the photodetector element in the semiconductor laser device of FIG. 9.

An enlarged view of a part of the hologram optical element 6 is illustrated in FIG. 11. The substrate 11, where the hologram optical element 6 and the photodetector element groups 9, 10 are integrated, is made of, for example, a semiconductor. Under the hologram optical element 6, a light absorption region such as a PIN photodiode is formed as the photodetector element group 18. Therefore, among the light beams entering the hologram optical element 6, the reflected and diffracted light is reflected by the light beam reflector 7 and detected by the photodetector element groups 9, 10. On the other hand, the light beam transmitted through the hologram optical element 6 is detected by the photodetector element group 18.

Figure 12:
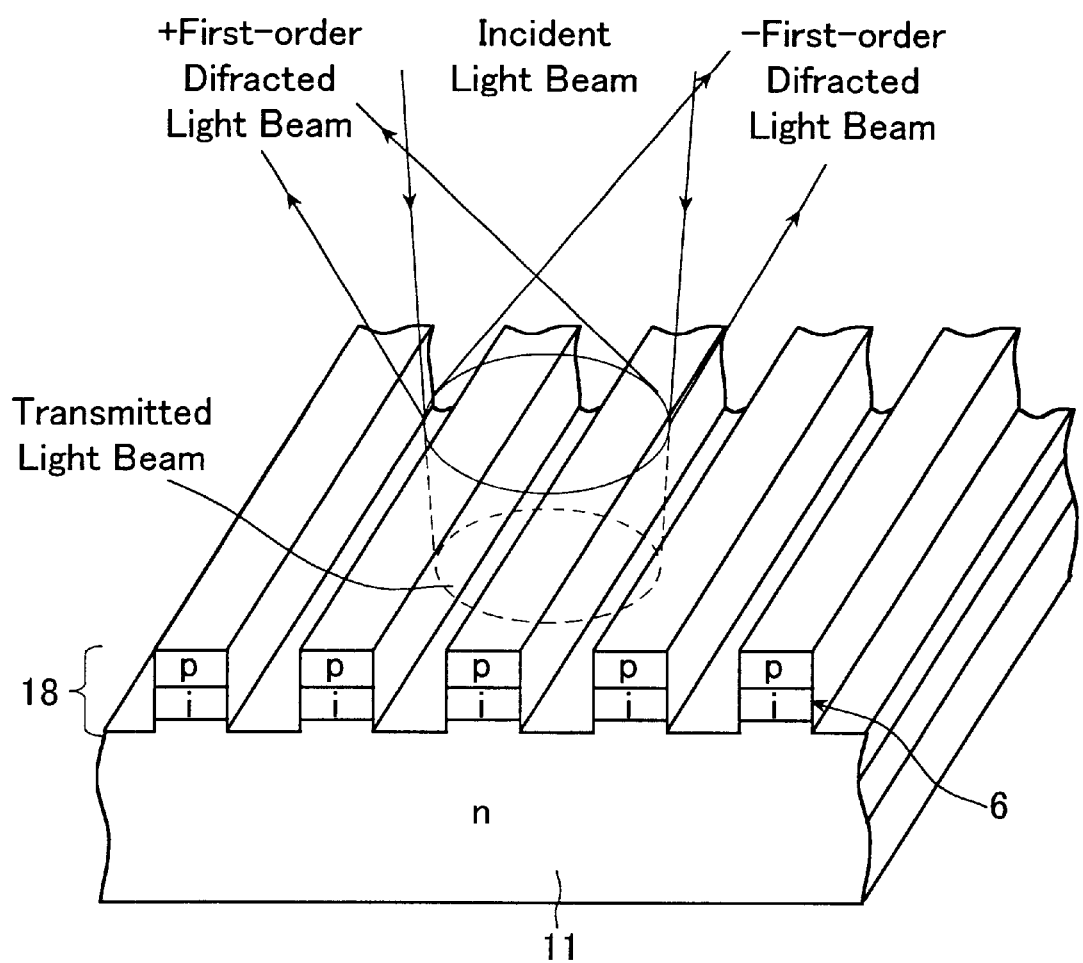
FIG. 12 is a perspective view showing another example of the configuration of the hologram optical element and the photodetector element in the semiconductor laser device of FIG. 9.

Furthermore, as illustrated in FIG. 12, the PIN photodiode constructing a light absorption region may be formed on convex portions of the hologram optical element 6 so as to integrate the hologram optical element 6 with the photodetector element group 18. This structure can be created, for example, by sequentially forming an i-type (high-resistance) semiconductor layer and a p-type semiconductor layer on top of a n-type semiconductor substrate, patterning the hologram optical element 6 by the photolithographic technique, and forming concave and convex portions by wet etching or dry etching. Accordingly, this structure can be formed easily by using conventional semiconductor processing techniques.

Figure 13:
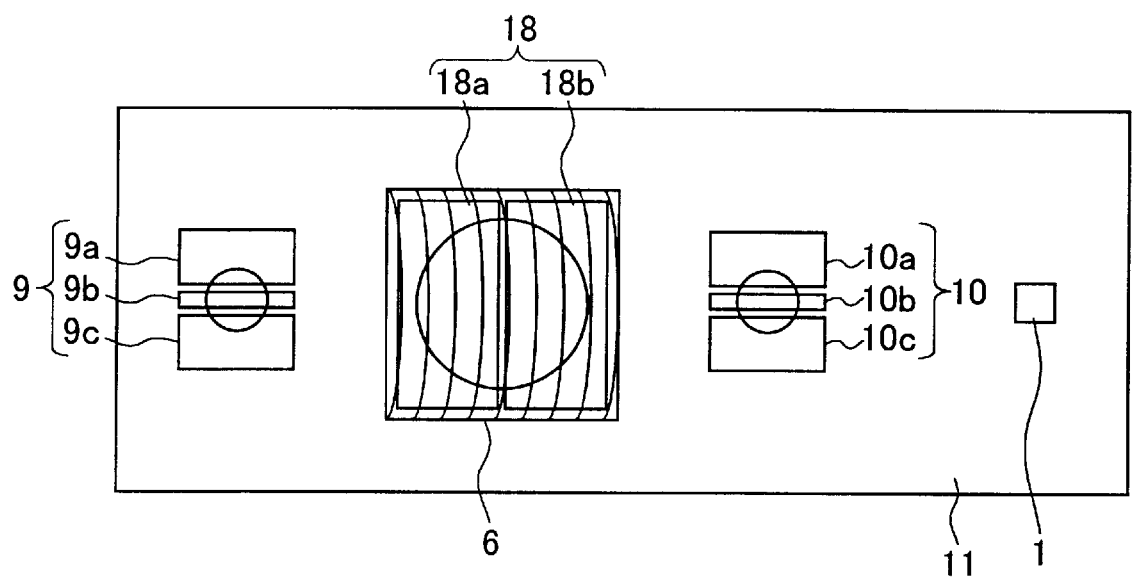
FIG. 13 is a plan view showing the substrate used for the semiconductor laser device of FIG. 9.

Next, the method for detection of reproduction signals and focus/tracking error signals according to the embodiment will be explained in the following. FIG. 13 is a plan view showing the substrate 11, where the semiconductor laser element 1, the hologram optical element 6, and the photodetector element groups 9, 10, and 18 are integrated. As illustrated in FIG. 13, the photodetector element groups 9, 10, and 18 are divided into elements 9a, 9b, 9c, 10a, 10b, 10c, 18a, and 18b. The focus error signals (FES) can be calculated by the Spot Size Detection (hereinafter referred to as SSD) Method according to the following arithmetic expression (1):

$$FES=(S9a+S9c+S10b)-(S9b+S10a+S10c) \quad (1)$$

where S9a, S10a etc. represent signal intensity received by the element 9a, the element 10a etc. Moreover, the tracking error signals (TES) can be calculated by the Push-pull Method according to the following arithmetic expression (2):

$$TES=S18-S18b \quad (2)$$

As for the reproduction signals (RFS), the total quantity of light received by the photodetector element groups, that is, signals calculated according to the following arithmetic expression (3) can be used:

$$RFS=S9a+S9b+S9c+S10a+S10b+S10c+S18a+S18b \quad (3)$$

Figure 14:
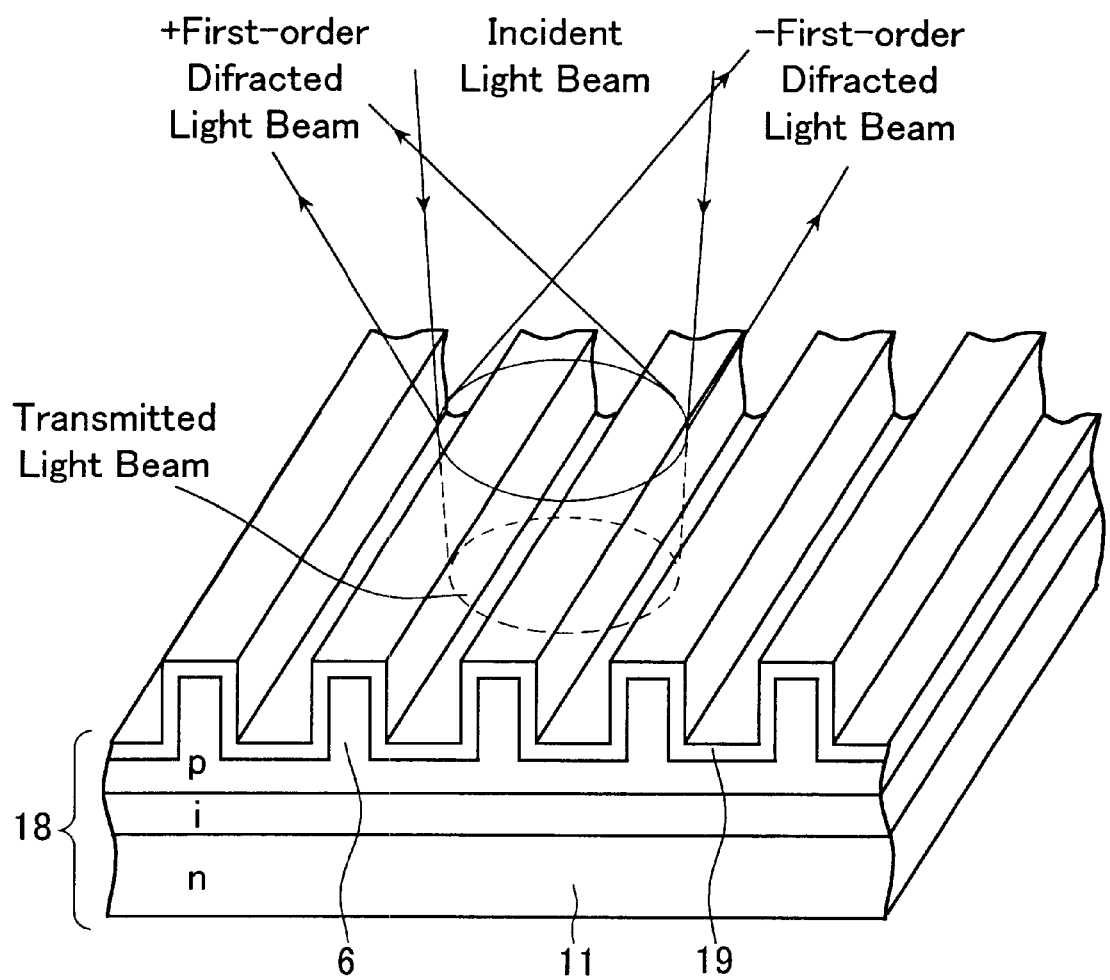
FIG. 14 is a perspective view showing yet another example of the configuration of the hologram optical element and the photodetector element in the semiconductor laser device of FIG. 9.

It is preferable to form, as illustrated in FIG. 14, a reflective film 19 having a predetermined reflectance on the entire surface of the hologram optical element 6 by using dielectrics etc. By suitably determining the reflectance, the amount of focus error signals detected at the photodetector element groups 9, 10 and the amount of tracking error signals detected at the photodetector element group 18 also can be adjusted respectively and optimized so as to increase the S/N ratio of both signals.

Figure 15A:
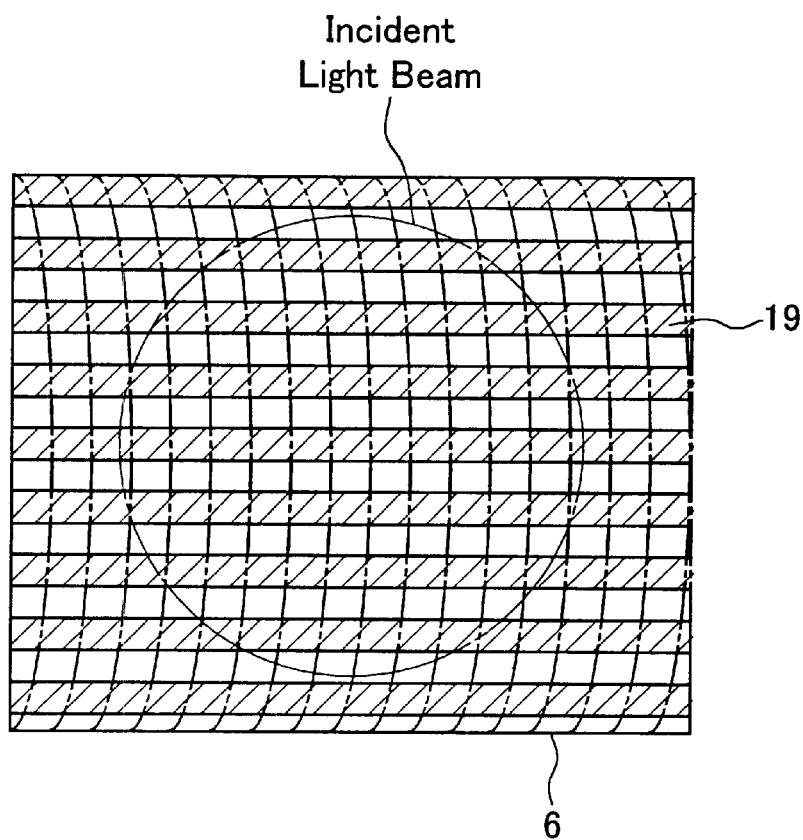
FIG. 15(A) and FIG. 15(B) show yet another example of the configuration of the hologram optical element and the photodetector element in the semiconductor laser device of FIG. 9.
Figure 15B:
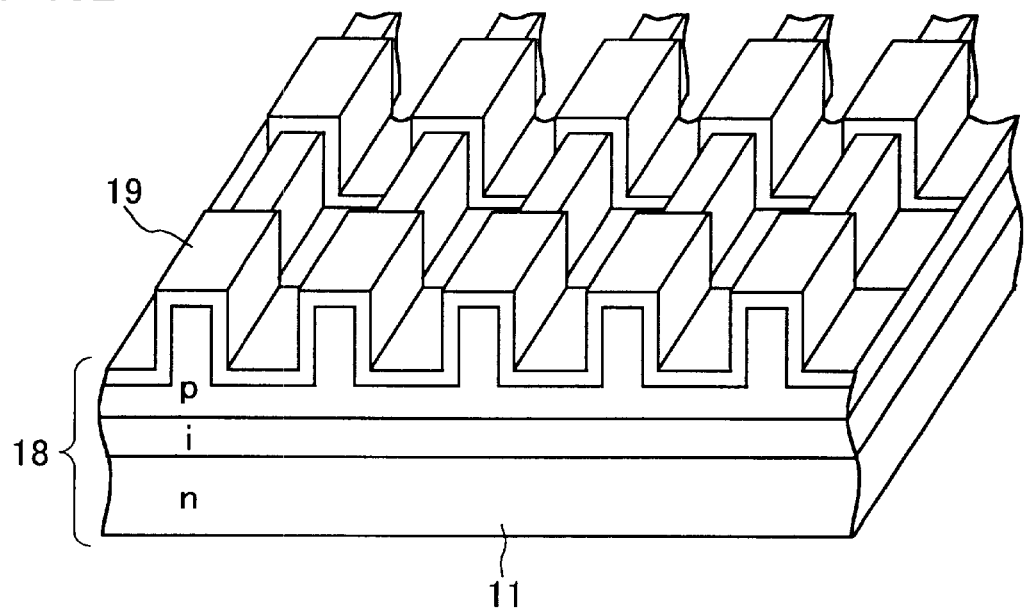

Additionally, as illustrated in FIG. 15(A) and FIG. 15(B), the surface of the hologram optical element 6 may be partially covered with the reflective film 19 made of metals or dielectrics etc. In the plan view of FIG. 15(A), the portions of the reflective film 19 are shown with hatching. FIG. 15(B) is an enlarged perspective view showing a part thereof. According to this configuration, the portions covered with the reflective film 19 function as the reflective hologram optical element, and the light beam entering the portions that are not covered with the reflective film 19 will be detected at the photodetector element group 18. By suitably determining the area of the reflective film 19, the amount of focus error signals detected at the photodetector element groups 9, 10 and the amount of tracking error signals detected at the photodetector element group 18 also can be adjusted respectively and optimized so as to increase the S/N ratio of both signals.

Figure 16A:
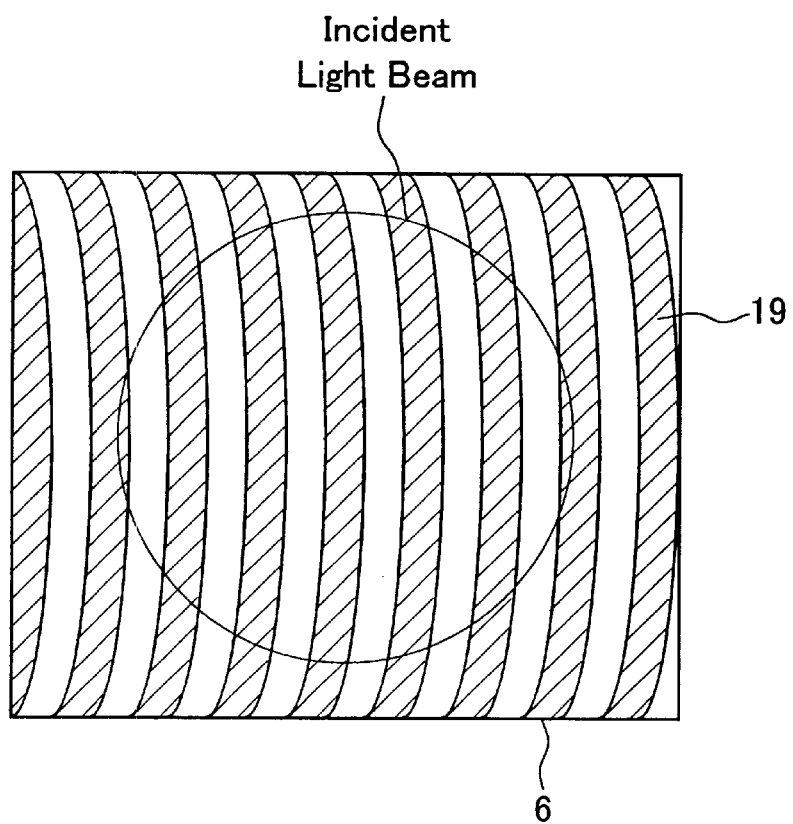
FIG. 16(A) and FIG. 16(B) show yet another example of the configuration of the hologram optical element and the photodetector element in the semiconductor laser device of FIG. 9.
Figure 16B:
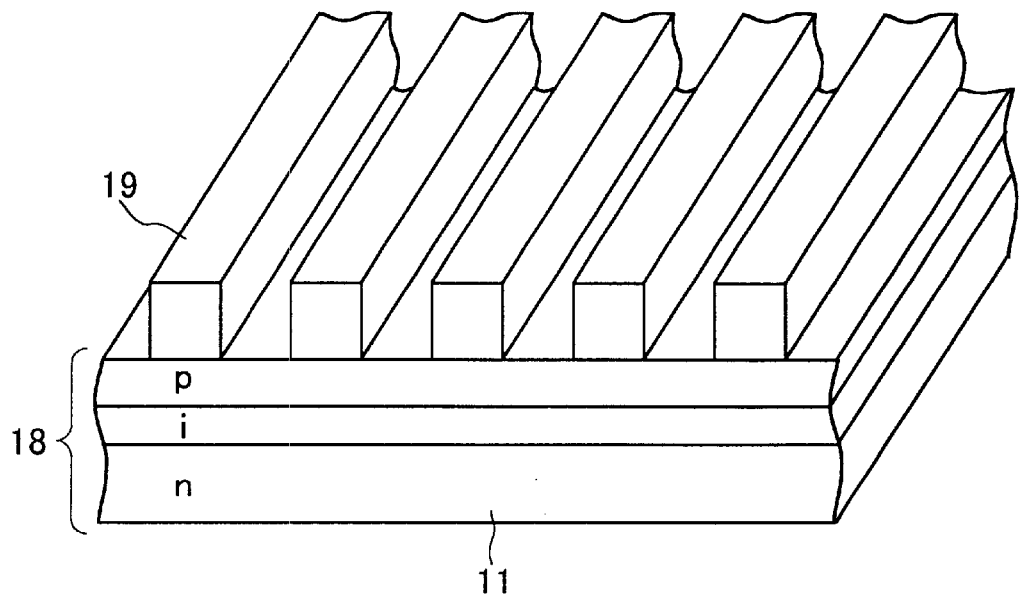

The arrangement of the reflective film 19 is not limited to the example illustrated in FIG. 15 in which the reflective film 19 is formed independently of the grating structure of the hologram optical element 6. The reflective film 19 may be arranged as illustrated in FIG. 16(A) and FIG. 16(B). In the plan view of FIG. 16(A), the portions of the reflective film 19 are shown with hatching. As clearly shown in the enlarged perspective view of a part thereof in FIG. 16(B), in this example, the reflective film 19 forms the grating structure of the hologram optical element 6.

Figure 17:
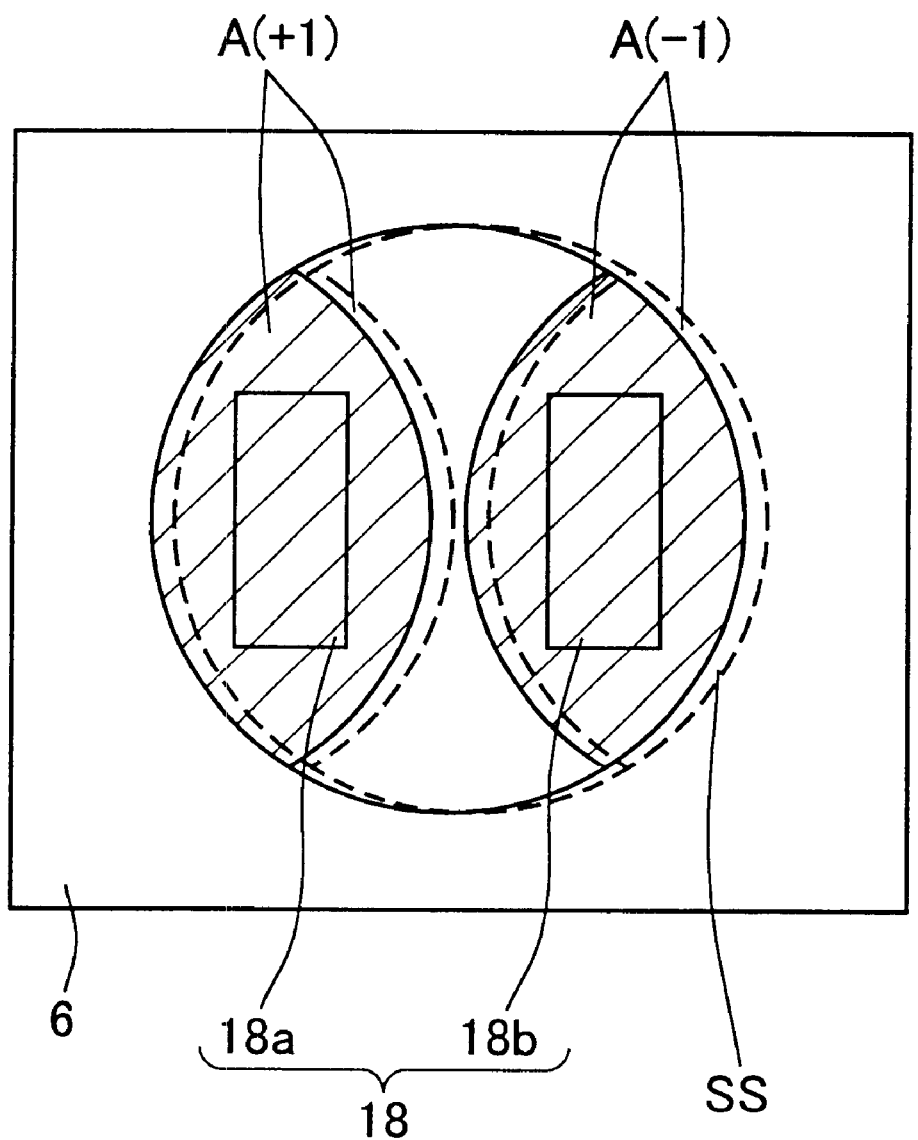
FIG. 17 is a plan view showing yet another example of the configuration of the hologram optical element and the photodetector element in the semiconductor laser device of FIG. 9.

Furthermore, the photodetector element group 18 may be arranged as illustrated in FIG. 17. In FIG. 17, a solid line shows a normal beam spot. A broken line shows a beam spot SS of a reflected light beam that is shifted due to the shift etc. of the objective lens 4. Among the reflected light beams from the optical recording medium 5 received at the surface of the photodetector element group 18, interference regions between the zero-order diffracted light beam and the ± first-order diffracted light beam are shown as A(+1). Interference regions between the zero-order diffracted light beam and the first-order diffracted light beam are shown as A(−1). Inside the interference regions A(+1) and the interference regions A(−1), photodetector elements 18a and 18b that are smaller than the respective interference regions are arranged. According to this configuration, it is possible to suppress the offset amount of tracking error signals arising when the light beam reflected from the optical recording means 5 is shifted at the surface of the photodetector element group 18 due to the shift etc. of the objective lens 4, and excellent tracking servo can be effected. In this case, the planar shape of the photodetector elements 18a and 18b can be optional, but both elements must have the same area.

In the structure shown in FIG. 13, the amount of signals detected at the photodetector element groups 9, 10, and 8 also can be adjusted by suitably determining the diffraction efficiency of the diffraction gratings forming the hologram optical element 6. In this case, the diffraction gratings can be constructed so as to include a plurality of regions having different diffraction efficiency.

According to the configuration described above, the hologram optical element 6 and the photodetector element group 18 are integrated inside the integrated substrate 11, so that it is possible to reduce the number of photodetector elements that are provided on the integrated substrate 11 in the regions other than the hologram optical element 6. As a result, the integrated substrate 11 can be miniaturized, which makes it possible to promote further miniaturization of the semiconductor laser device and cost reduction.

Embodiment 7

Embodiment 6 is related to the semiconductor laser device using the 1-beam system, but the configuration using the same photodetector element group 18 as in Embodiment 6 also can be applied to the semiconductor laser device using the 3-beam system as in Embodiment 1. One example of such a semiconductor laser device will be explained in Embodiment 7 with reference to FIG. 18 and FIG. 19.

Figure 18:
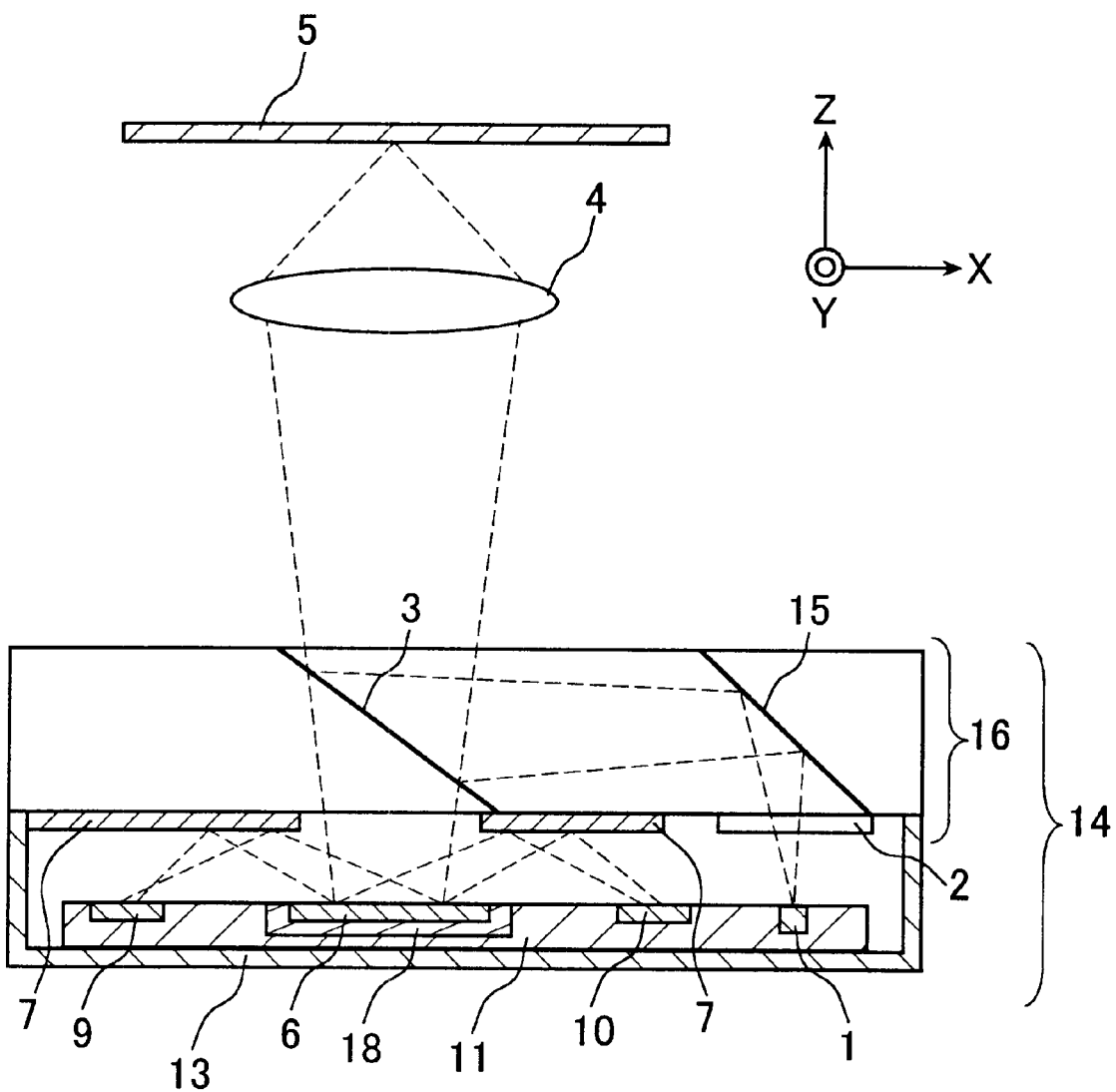
FIG. 18 is a sectional view showing a semiconductor laser device according to Embodiment 7.
Figure 19:
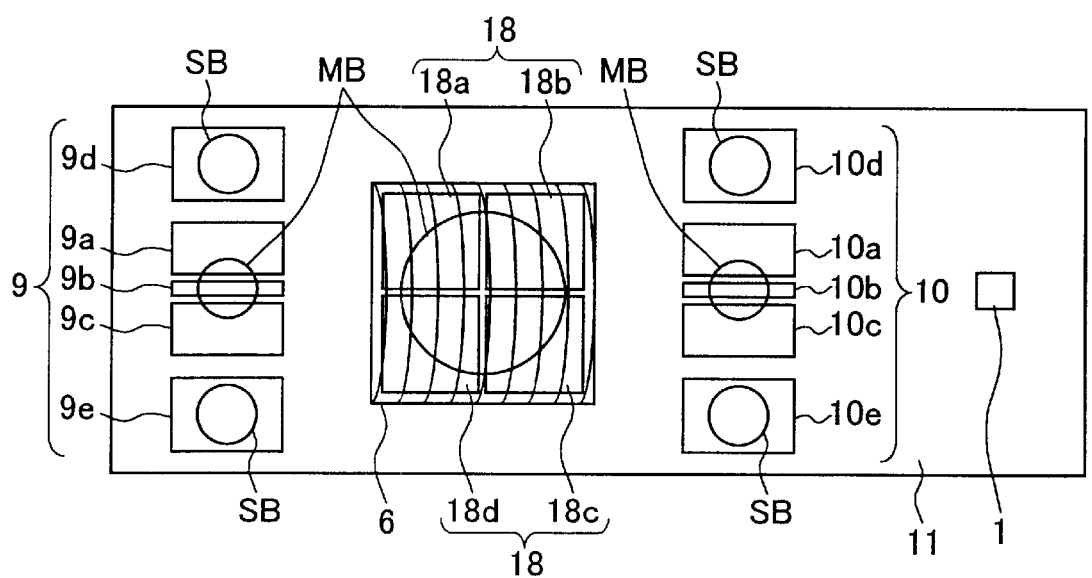
FIG. 19 is a plan view showing the arrangement of the hologram optical element and the photodetector element groups disposed on the substrate of the semiconductor laser device illustrated in FIG. 16.
Figure 20:
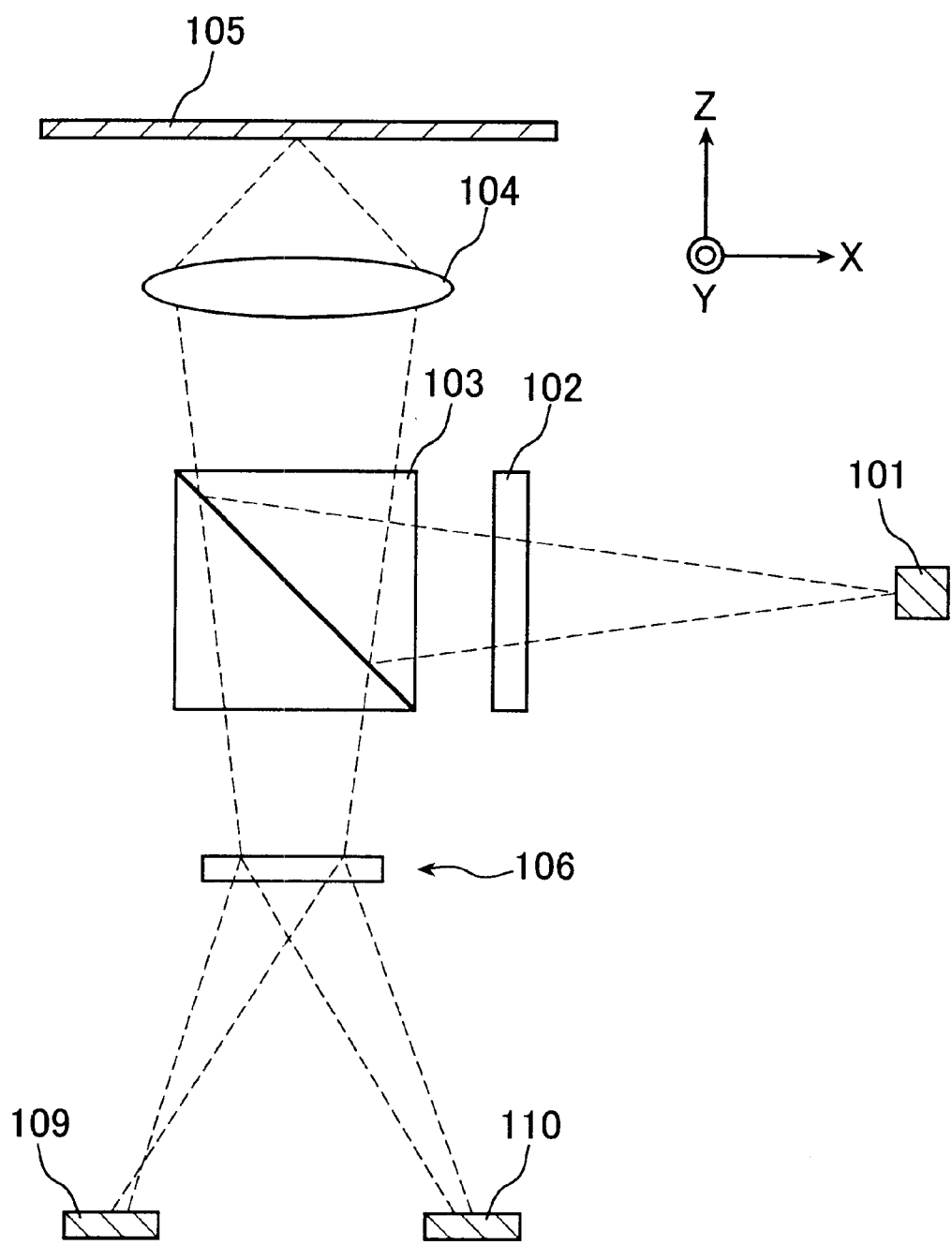
FIG. 20 is a sectional view showing a conventional semiconductor laser device.

FIG. 18 is a sectional view showing the configuration of the semiconductor laser device in Embodiment 7. FIG. 19 is a plan view showing the integrated substrate 11 of the semiconductor laser device illustrated in FIG. 18. The basic arrangement of each element in the device shown in FIG. 18 is the same as that of the semiconductor laser device in Embodiment 6 illustrated in FIG. 10. However, the former device differs from the latter device in that the 3-beam formation diffraction grating 2 is added, and that, as shown in FIG. 19, the photodetector elements 9d, 9e, 10d, and 10e for subbeams (SB) are formed in the integrated substrate 11. These additional elements make it possible to detect tracking error signals by the 3-beam method that generally is used for reproduction etc. of CD. In this case, the tracking error signals by the 3-beam method ($TES_{3B}$) can be calculated according to the following arithmetic expression (4):

$$TES_{3B}=(S9d+S10d)-(S9e+S10e) \quad (4)$$

In this embodiment, as shown in FIG. 19, the photodetector element group 18 that is provided directly under the hologram photodetector element 6 includes elements 18a, 18b, 18c, and 18d arranged such that 4 equally divided beam spots are received. Accordingly, the detection of tracking error signals using the Push-pull Method or the Differential Phase Detection Method can be performed. The tracking error signals by the Push-pull Method ($TES_{pp}$) can be calculated according to the following arithmetic expression (5):

$$TES_{pp}=(S18a+S18d)-(S18b+S18c) \quad (5)$$

Moreover, the tracking error signals by the Differential Phase Detection Method can be calculated according to the following arithmetic expression (6):

$$TES_{PD}=(S18a+S18c)-(S18b+S18d) \quad (6)$$

According to the configuration in this embodiment, it is possible to use a plurality of methods for detecting tracking error signals such as the 3-beam Method, the Push-pull Method, and the Differential Phase Detection Method. Therefore, the most suitable detection system of detecting tracking error signals can be selected in compliance with the standard of each disk, and signals from different kinds of disks such as CD and DVD also can be reproduced. Furthermore, it is possible to construct the semiconductor laser element 1, for example, as a semiconductor element having two oscillation wavebands of 650 mm and 780 mm, and driven by selecting the oscillation wavelength for each disk standard.

As described above, the semiconductor laser device of the present invention is configured such that the light beam branching element for branching a reflected light beam from the optical recording medium and the plurality of detectors for detecting the light beam branched by the light beam branching element are integrated on the same substrate, so that the miniaturization of the device is achieved. Furthermore, since the relative location between the light beam branching element and the plurality of detectors is determined at the time when the substrate is formed, position adjustment with high-precision, which has been required conventionally, is no longer necessary during assembly. Therefore, the time and the cost needed for assembly can be reduced. Moreover, further miniaturization can be achieved by integrating some of the detectors into the light beam branching element.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A semiconductor laser device comprising:
   a semiconductor laser element,
   a light beam branching element for branching a light beam emitted from the semiconductor laser element and reflected by an optical recording medium into a plurality of light beams,
   a first light beam reflector for reflecting the light beam branched by the light beam branching element,
   a second light beam reflector for reflecting the light beam emitted from the semiconductor laser element so that the light beam advances toward the optical recording medium before advancing toward the light beam branching element, and
   a photodetector portion for detecting the light beam reflected by the light beam reflector,
   wherein the light beam branching element and the photodetector portion are formed on a single substrate.

2. The semiconductor laser device according to claim 1, further comprising a package containing the substrate, wherein an optical element provided with the light beam reflector is mounted on top of the package to seal the substrate in the package.

3. The semiconductor laser device according to claim 1, wherein the semiconductor laser element, the light beam branching element, and the photodetector portion are formed on the substrate.

4. The semiconductor laser device according to claim 1, wherein the light beam branching element is a hologram optical element that reflects and diffracts a light beam.

5. The semiconductor laser device according to claim 4, wherein a reflective film is formed on the surface of the hologram optical element.

6. The semiconductor laser device according to claim 1, wherein the light beam branching element partially branches, reflects, and transmits the incident light beam, and a photodetector portion for detection of the transmitted light beam is formed in the substrate.

7. The semiconductor laser device according to claim 6, wherein the light beam branching element comprises one or a plurality of diffraction grating regions forming the hologram optical element.

8. The semiconductor laser device according to claim 7, wherein the plurality of diffraction grating regions include regions having different diffraction efficiency.

9. The semiconductor laser device according to claim 8, wherein a reflective film is formed on the surface of the diffraction grating region, and reflectance of the reflective film is determined such that reflected components and transmitted components of the incident light beam are produced in a predetermined ratio.

10. The semiconductor laser device according to claim 8, wherein a reflective film is formed on a part of the surface of the diffraction grating region, and a ratio of the area of the reflective film to the area of the entire diffraction grating region is determined such that reflected components and transmitted components of the incident light beam are produced in a predetermined ratio.

11. The semiconductor laser device according to claim 6, wherein the photodetector portion comprises a p-type layer, a high-resistance layer, and a n-type layer, which are formed sequentially from the surface of the light beam branching element toward the inside.

12. The semiconductor laser device according to claim 7, wherein the photodetector portion comprises a p-type layer, a high-resistance layer, and a n-type layer, which are formed on convex portions of the diffraction grating region sequentially from the surface of the light beam branching element toward the inside.

13. The semiconductor laser device according to claim 6, wherein the photodetector portion is divided into a plurality of regions.

14. The semiconductor laser device according to claim 13, wherein each of the plurality of regions is formed inside interference regions between a zero-order diffracted light beam and a + first-order diffracted light beam and interference regions between a zero-order diffracted light beam and a − first-order diffracted light beam among the light beams reflected on the optical recording medium.

15. The semiconductor laser device according to claim 1, wherein a 3-beam formation diffraction grating element is provided along a light path of a light beam from the semiconductor laser element to the optical recording medium.

16. The semiconductor laser device according to claim 15, wherein the 3-beam formation diffraction grating element and the light beam branching element are integrated.

* * * * *

UNITED STATES PATENT AND TRADEMARK OFFICE
CERTIFICATE OF CORRECTION

PATENT NO. : 6,614,743 B1
DATED : September 2, 2003
INVENTOR(S) : Nakanishi et al.

It is certified that error appears in the above-identified patent and that said Letters Patent is hereby corrected as shown below:

<u>Column 1,</u>
Line 34, "means, e g." should read -- means, e.g. --

<u>Column 9,</u>
Line 63, "reflected by the light beam reflector," should read -- reflected by the first light beam reflector, --

<u>Column 10,</u>
Line 1, "with the light beam" should read -- with the first light beam --.

Signed and Sealed this

Twenty-second Day of June, 2004

JON W. DUDAS
*Acting Director of the United States Patent and Trademark Office*